Figure 1:
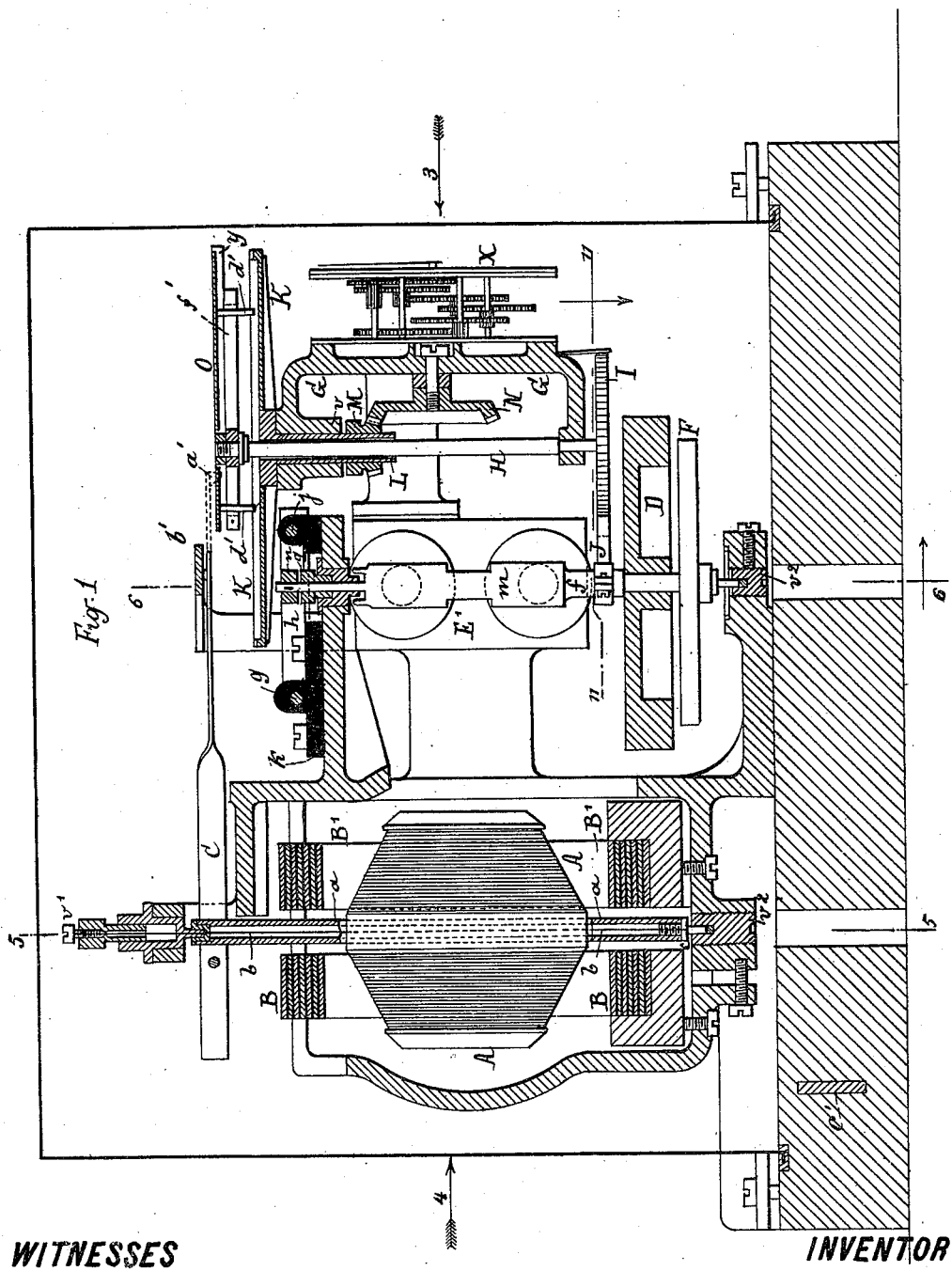

(No Model.) 6 Sheets—Sheet 1.

A. J. FRAGER.
ELECTRIC METER.

No. 418,559. Patented Dec. 31, 1889.

WITNESSES
John Becker
C. K. Fraser.

INVENTOR.
Alphonse Jean Frager,
By his Attorneys,
Arthur C. Fraser & Co.

(No Model.)

6 Sheets—Sheet 2.

A. J. FRAGER.
ELECTRIC METER.

No. 418,559. Patented Dec. 31, 1889.

WITNESSES.
John Becker
C. K. Fraser.

INVENTOR.
Alphonse Jean Frager.
By his Attorneys,
Arthur C. Fraser & Co.

(No Model.)
A. J. FRAGER.
ELECTRIC METER.
No. 418,559. Patented Dec. 31, 1889.
6 Sheets—Sheet 3.
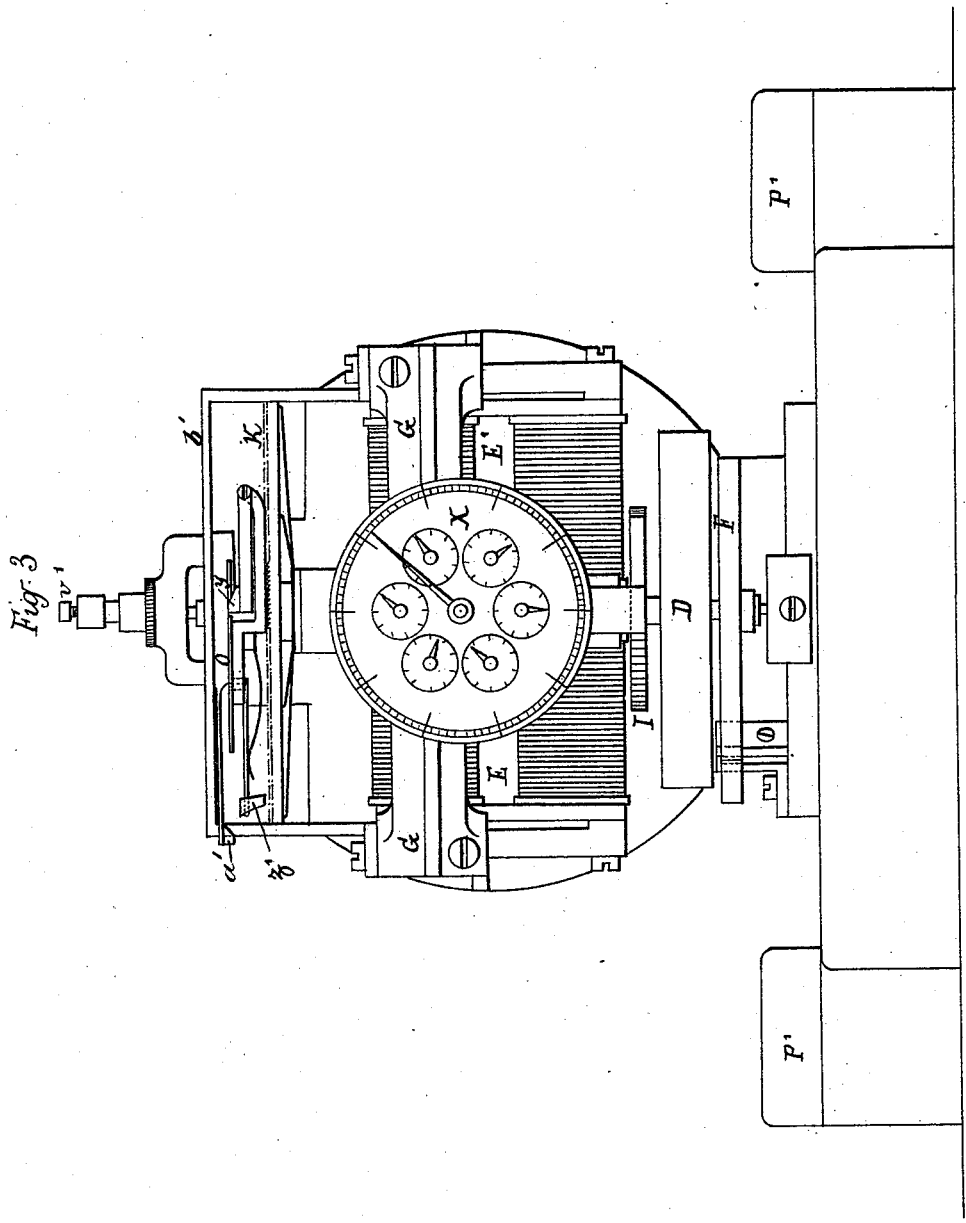
WITNESSES
John Becker
C. K. Fraser.
INVENTOR.
Alphonse Jean Frager,
By his Attorneys,
Arthur G. Fraser & Co.

(No Model.) 6 Sheets—Sheet 4.
A. J. FRAGER.
ELECTRIC METER.
No. 418,559. Patented Dec. 31, 1889.
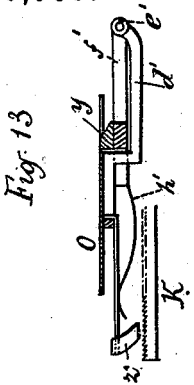
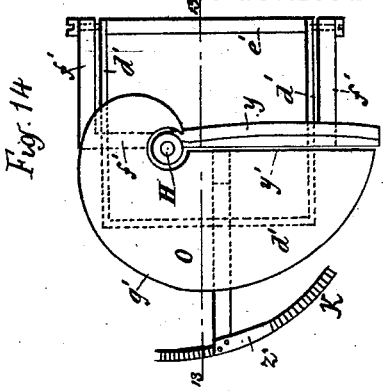
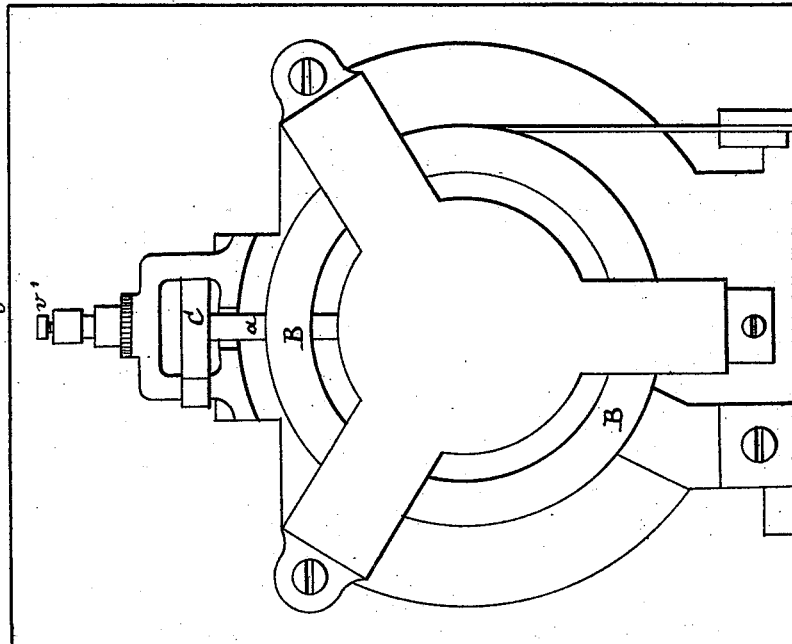
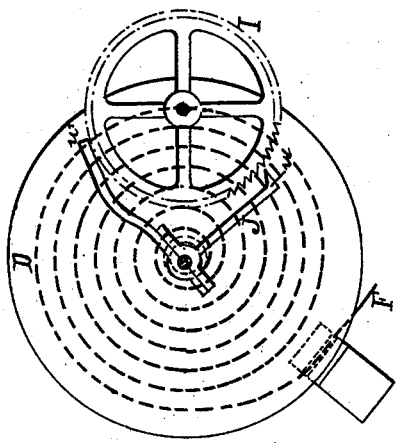
WITNESSES.
John Becker
C. K. Fraser.
INVENTOR.
Alphonse Jean Frager.
By his Attorneys,
Arthur G. Fraser & Co.
N. PETERS, Photo-Lithographer, Washington, D. C.

(No Model.) 6 Sheets—Sheet 5.
A. J. FRAGER.
ELECTRIC METER.
No. 418,559. Patented Dec. 31, 1889.
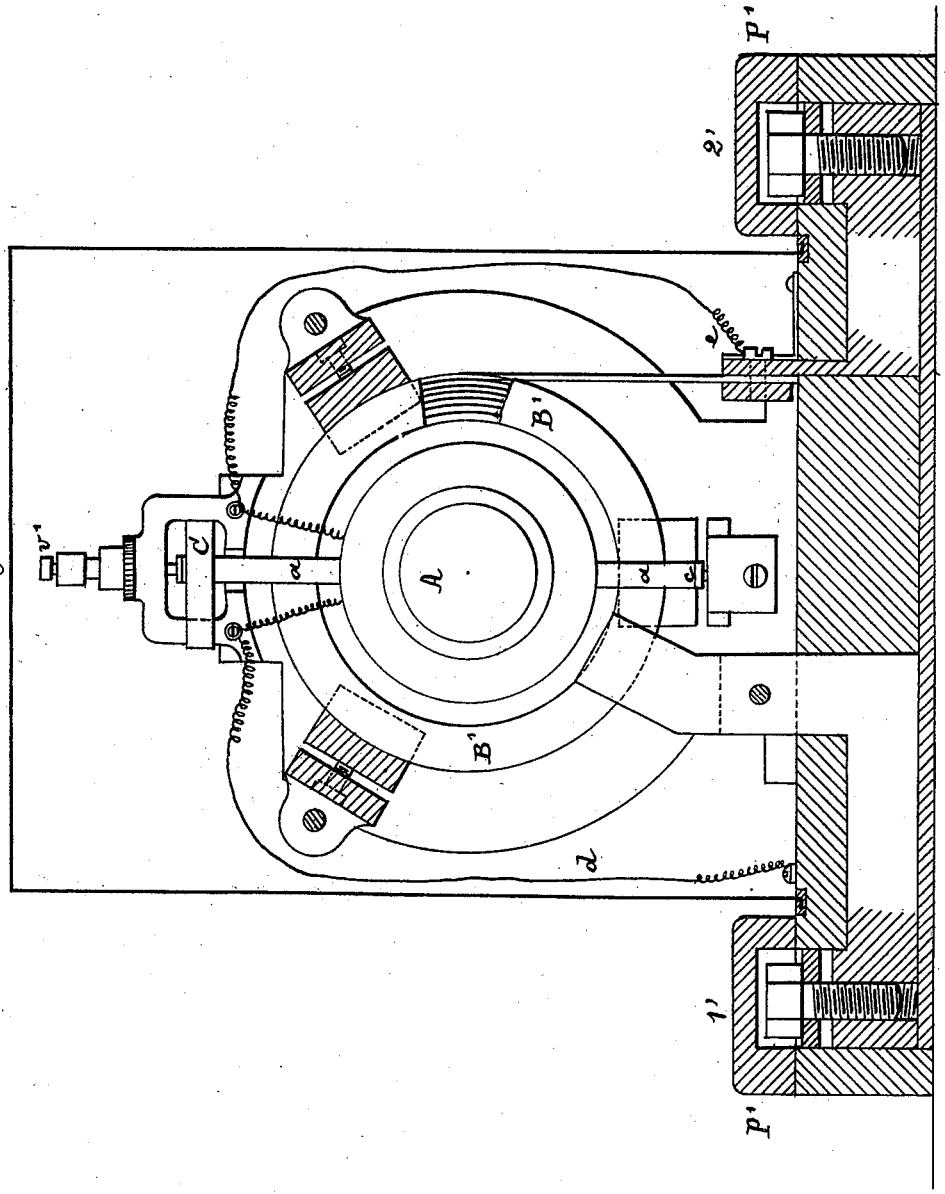
WITNESSES
John Becher
C. K. Frazer.
INVENTOR.
Alphonse Jean Frager,
By his Attorneys,
Arthur C. Fraser & Co.

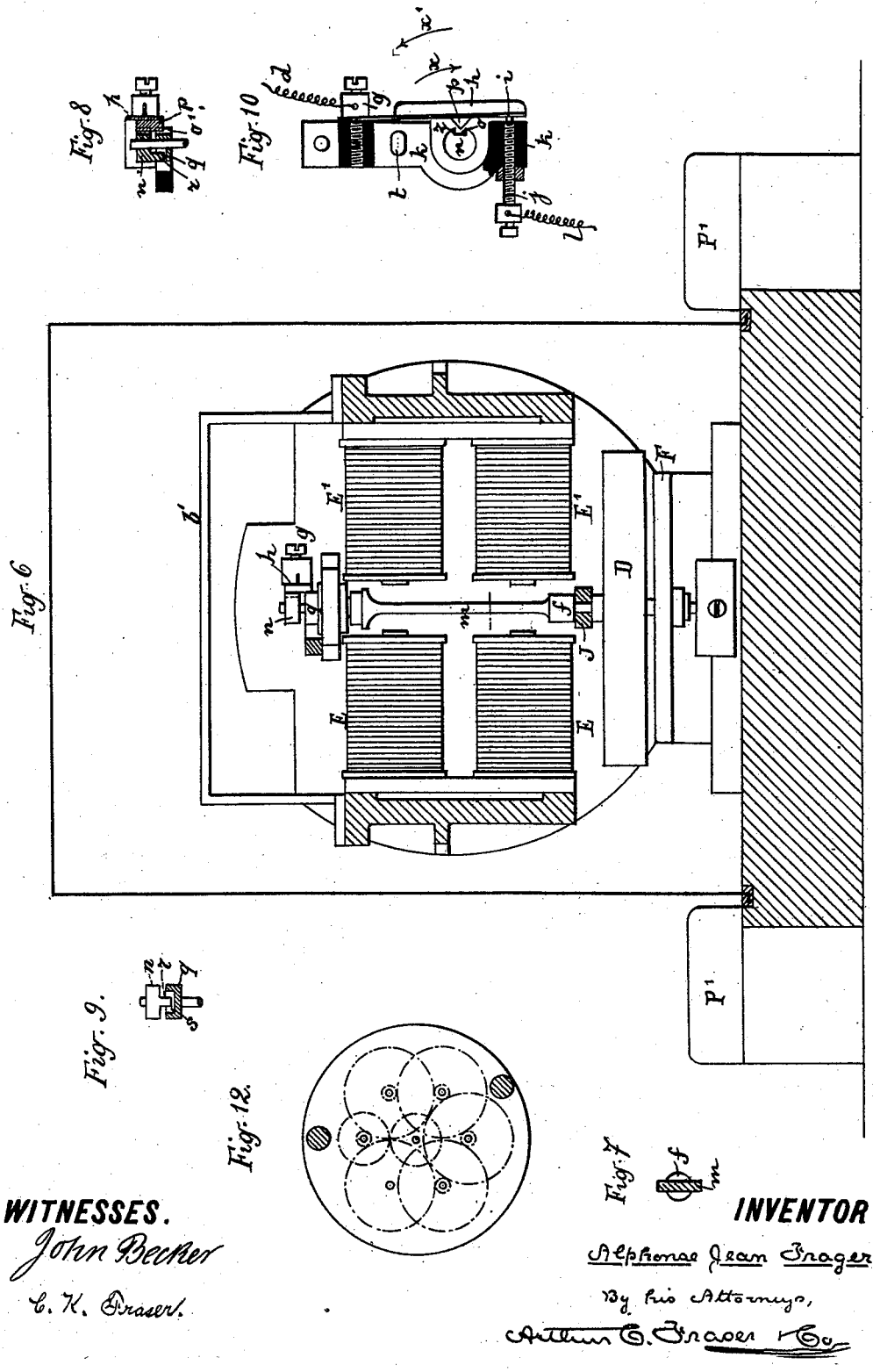

UNITED STATES PATENT OFFICE.

ALPHONSE JEAN FRAGER, OF PARIS, FRANCE.

ELECTRIC METER.

SPECIFICATION forming part of Letters Patent No. 418,559, dated December 31, 1889.

Application filed June 14, 1889. Serial No. 314,197. (No model.)

*To all whom it may concern:*

Be it known that I, ALPHONSE JEAN FRAGER, a citizen of the Republic of France, residing in Paris, France, have invented certain new and useful Improvements in Electric Meters, of which the following is a specification.

This invention relates to apparatus for measuring electrical energy. My electric meter includes a means for determining or indicating at any moment the intensity or rate of current flow on a circuit, or the difference of potentials between any two points thereof, which I call an "electric dynamometer," and an instrument for counting up or registering the expenditure of electric energy.

This electric meter is applicable either in the case of a uniform current, the varying differences of potential between the terminals of the branch circuit or loop being measured are to be registered, or to the case of a current of uniform electro-motive force, the variations of flow of which from time to time require to be registered.

My improved meter is of that class wherein a counting or registering apparatus is advanced at intervals during the time that the energy to be measured is being consumed, and at each advance is moved forward a greater or less distance in proportion as a greater or less amount of energy is at that moment being consumed; or, in other words, it is of that class wherein at stated intervals of time—say every minute or every five minutes—a reading is automatically taken from an indicating-instrument, either an ammeter or a voltmeter, as the case may be, and these successive readings are added up or superposed automatically by registering mechanism.

My electric meter comprises the combination of the following instrumentalities: first, an electro-dynamometer, which indicates at each instant the electrical energy expended per second; second, a clock-work, which measures time and marks off the intervals at which the energy is counted up; third, a registering apparatus, which carries into effect the product of the first two quantities and indicates on dials the total energy consumed.

I will now proceed to describe the construction of my new electric meter and its operation with reference to the annexed drawings, wherein—

Figure 2:
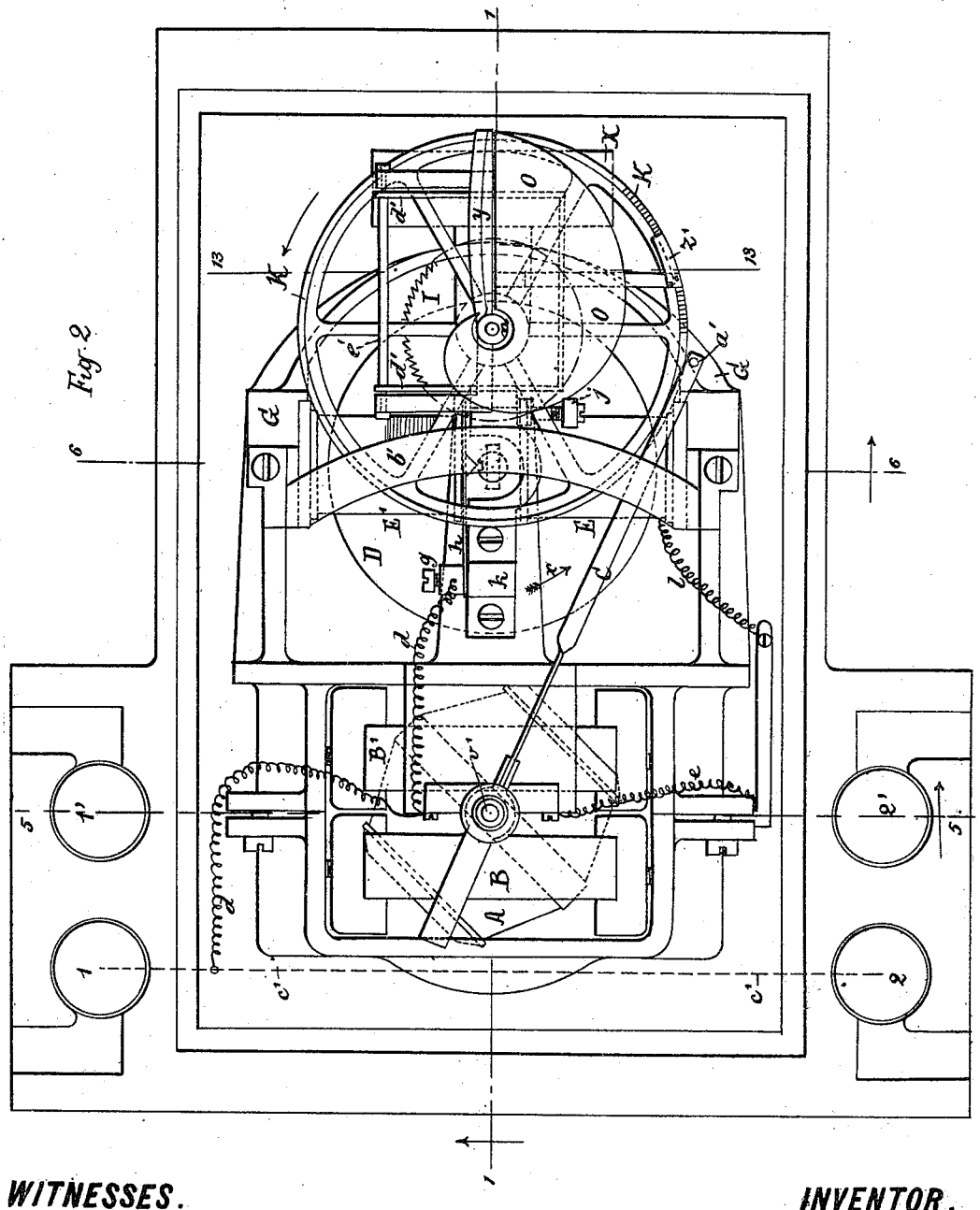

Figure 1 is a vertical longitudinal section cut in the plane indicated by the line 1 1 in Fig. 2. Fig. 2 is a plan. Fig. 3 is an end view looking in the direction of the arrow 3 in Fig. 1. Fig. 4 is an elevation of the opposite end, as indicated by the arrow 4 in Fig. 1, the inclosing-case being removed in both these figures. Fig. 5 is a transverse section on the line 5 5 in Figs. 1 and 2. Fig. 6 is a transverse section on the lines 6 6 in Figs. 1 and 2. Fig. 7 is a transverse section through the vertical arbor of the balance-wheel of the clock-work. Figs. 8, 9, and 10 are respectively a vertical section, a front view, and a sectional plan of the upper end of the said arbor. Fig. 11 is a horizontal section of the balance-wheel and the ratchet mechanism driven thereby. Fig. 12 is an elevation of the wheel-work of the register. Fig. 13 is a vertical section in the plane of the line 13 13 in Fig. 14, showing the details of the clutching device for coupling together the motor and register at intervals. Fig. 14 is a fragmentary plan of this clutching device.

The electro-dynamometer is constructed of two solenoids. Of these the one lettered A is of fine wire of high resistance and is movable around a vertical axis $a$. It is traversed by a derived current extending outside of the circuit of the subscriber. The volume of this current is at each instant proportional to the difference of potential between the two extremities of this derived circuit. The other solenoid is formed of two fixed coils B B', arranged vertically and traversed each by a half of the distributed current.

The movable coil A is mounted on a tubular arbor $a$, traversed by a wire $b$, which serves both as a suspension-wire and as a torsional spring. The wire $b$ is attached at $c$ to the base of the arbor, and at the top it is fixed to an adjusting-screw $v'$.

The action of the fixed solenoid B B' on the movable solenoid A reduces itself to a couple the moment of which proportional to the energy of the distributed current is the function of the angle which is made between the axes of the solenoids, and on the other hand the resistant couple of the torsional wire $b$ is proportional to the angle of deviation. It results from this that the position of the needle C, which is fixed on the arbor $a$ of the movable coil, is determined by the expenditure of electrical energy measured by the apparatus. The movable solenoid and its needle form a system in indifferent equilibrium under the action of their weight.

In order to realize the passage of the currents such as I have just described, the coils B B' are connected to one of the poles of the station by the terminal 2' and to the circuit of the subscriber by the terminal 1'. The terminals 1 and 2, which are connected between them in the interior of the apparatus, receive indifferently the one the second wire of the station and the other the second end of the circuit of the subscriber. The entire circuit of the subscriber passes thus through the fixed coils, one-half through each of them. The fine wire of the electro-dynamometer A is connected in derivation between the conductor $c'$, which connects 1 and 2, as at $d$, and any point whatever of the connection between 1' and 2', as at $e$. It is thus a shunt of the subscriber's circuit or loop.

The clock-work is composed of a balance-wheel D on a vertical arbor provided with a hair-spring F and beating seconds. Its movement is produced and maintained electrically by the following arrangement: The arbor $f$ of the balance-wheel is flattened in its middle part, as shown in section in Fig. 7, to form a magnet-armature. It is mounted in the longitudinal plane of two horseshoe electro-magnets E E', the coils of which magnets are connected in derivation like the coil of the dynamometer—that is to say, their conductor terminates at one end in communication between 1 and 2 and at the other end between 1' and 2'. The connections are made between the coils of these magnets in such a manner as to form a single magnetic circuit, or, in other words, so that each horseshoe-magnet closes the magnetic circuit of the other. The connection between $e$ and the coils of the magnets E E' is established directly, but that of these coils with the conductor 1 2 at $d$ is made through the intermediation of a screw $g$, insulated from the metal, but in contact with a spring $h$, the extremity of which, as shown in Figs. 2 and 10, is arranged opposite a point $i$, fixed to a screw $j$, likewise insulated by a block of ebonite at $k$, this screw $j$ being connected to a conductor $l$, which terminates at $e$ after having traversed the coils of the electro-magnets E E'. While at rest the armature or flat part $m$ of the arbor $f$ of the balance-wheel is inclined at about forty-five degrees to the median plane of the electro-magnets E E'.

The upper part of the axis of the arbor $f$ of the balance-wheel is constructed as follows:

A head $n$, fixed by a pin to the upper part of said arbor, is formed with a notch $o$, with which engages a tooth $p$ on the spring $h$, and in this position the spring $h$ touches the point $i$ and the circuit is closed. Under the head $n$ is another head $q$, loose on the same arbor (see Figs. 1, 8, and 9) and formed with a notch $o'$ of the same dimension as the notch $o$ in the head $n$, Figs. 8 and 10. The upper head $n$ carries on its under side a tooth $r$, which plays in a recess $s$ in the loose head $q$, this recess $s$ being wider than the tooth $r$. It is by the striking of this tooth $r$ against the ends of the recess $s$ that the arbor $f$ drives the head $q$ when the balance-wheel oscillates.

When the apparatus is put in circuit, the flattened portion $m$ of the arbor $f$ is attracted into the median plane of the electro-magnets E E', and by the oscillation of the arbor the head $n$ turns in the direction of the arrow $x$, Figs. 2 and 10, thus driving the head $q$ toward the left in Fig. 9. In this position the two notches $o$ $o'$ of the two heads $n$ and $q$ coincide, and their sides $z$ $z$ lift together against the tooth $p$ of the spring $h$, thereby pressing the spring out of contact with the point $i$ and breaking the circuit, so that the current ceases to flow through the electro-magnets E E'. The balance-wheel then turns backward in the direction of the arrow $x'$, Fig. 10, under the action of the spiral spring F, and the notch $o$ of the head $n$ is displaced relatively to the head $q$ to an extent slightly greater than the width of the two notches $o$ $o'$, so that the tooth $p$ of the spring $h$ cannot fall back, since it encounters only one notch at a time on the two heads $n$ and $q$ during this backward movement. When the balance-wheel comes back again in the first direction $x$, the relative displacement of the two heads $n$ and $q$ brings the notches $o$ and $o'$ again into coincidence, and the tooth $p$ of the spring H enters into these notches and rests there during the remainder of the movement in this direction. In this position of the spring $h$ the circuit through the electro-magnets is closed. Thus the balance-wheel D receives at each double oscillation an impulsion. When the current to the subscriber is interrupted, the balance-wheel stops and the tooth $p$ places itself in the two notches $o$ $o'$, so that the apparatus is ready to restart as soon as the current is again sent through it.

The piece of ebonite $k$, which supports the spring $h$ and screws $g$ and $j$, is fixed on the upper bearing-support in such manner that by means of the screw $j$ the pressure of contact between $h$ and $i$ may be regulated, and also the penetration of the tooth $p$ into the notches $o$ $o'$ of the heads may be regulated by means of the play permitted at the elongated hole $t$, through which passes the screw which fixes the piece $k$ to the bearing-frame.

The registering apparatus is carried by a frame G, which is fastened by two screws at the front of the counter. It is composed of a vertical arbor H, to the lower part of which is fixed a wheel I, having one hundred teeth actuated directly by a ratchet J, as shown in Fig. 11. This ratchet J is mounted eccentrically on the balance-wheel arbor $f$. At each oscillation the point $u$ of the ratchet engages the teeth and advances the ratchet-wheel the space of one tooth, while the tail $u'$ of the ratchet limits the required movement of the point with reference to the wheel during the return of the balance-wheel. The arbor H of the register makes thus a complete revolution for each one hundred seconds. This arbor H carries at its upper end a system of gearing, described hereinafter, which, under the action of the needle C of the dynamometer, meshes at each turn to a suitable extent with the large wheel K, which drives the counter-train. This wheel K is mounted on a tubular shaft L, concentric with the arbor of the toothed wheel I, and which carries underneath the bearing $v$ a bevel-pinion M, gearing with a bevel-wheel N, fixed on the first arbor of the counter-train, which actuates the hands of the dials X of the register. This train of wheels and these dials, which are shown in Figs. 1, 3, and 12, are of any usual construction and present no especial novelty.

The mechanical movement shown in the fragmentary vertical section, Fig. 13, and the fragmentary plan, Fig. 14, is composed of two principal parts—an upwardly-inclined plane $y$ and a cam O, which carries a pawl $z'$, arranged over the large wheel K. The inclined plane $y$ consists of an arm radiating from and fixed to the upper end of the arbor H. The cam O consists of a plate carried on the lever-frame $d'$, which is pivoted on an axis $e'$, carried on a frame $f'$, which is fixed on the arbor H, so that the plate O revolves with the inclined plane $y$. This cam-plate O is shaped with a straight front edge $y'$, parallel with and just behind the rear side of the inclined plane $y$ and with an approximately spiral rear edge $g'$. (See Fig. 14.) The inclined plane $y$, in turning horizontally with the arbor H, encounters at each turn the point $a'$ of the needle C of the dynamometer. This point is elevated by the inclined plane in passing, and the needle is pressed against the bridge $b'$, which is fixed to the frame, and is curved concentrically with the axis $a$ of the dynamometer. The needle is thus at each turn of the arbor H seized in the position of equilibrium which it then occupies. When the inclined plane $y$ has passed the point $a'$ of the needle, the latter, by reason of its elasticity, falls on the cam O. This cam, which by reason of its pivotal mounting is movable up and down, being normally pressed up by a spring $h'$, is pressed down by the needle, so that a pawl $z'$, which it carries, engages in the teeth of the wheel K, so that this wheel is thus driven during all the time that the needle remains on the cam O. The point $a'$ of the needle traces on this cam O an arc of a circle of which the angle with the center is for each position proportional to the energy of the current to be measured. This result is attained by the conformation of the curve $g'$, which is made to compensate for the variations in the deflection of the needle from a direct proportion relatively to the variations of the current. The extent of rotation of the wheel K is thus also proportional to this energy, and the registering-wheels advance in each period of one hundred seconds to an extent which represents the expenditure of energy during this time; hence I have thus realized the conditions required for obtaining a counter of electric energy. By substituting for the electro-dynamometer an ampère-meter the instrument may be made a counter of the quantity of electricity. To do this it is only necessary to replace the solenoid A by a bar of soft iron.

The entire apparatus is inclosed in a casing of glass or of zinc, with an opening through which the dials may be seen, and is fixed in place by leveling-screws.

The terminals or binding-posts 1 1' and 2 2' are outside of the case, under the wooden plates P', which are screwed down and sealed.

The sockets in the lower end of the arbor $a$ of the electro-dynamometer and the arbor $f$ of the balance-wheel are entered by screws $v^2$, Fig. 1, which may be turned from the exterior in such manner as to clamp these arbors fast during transportation. The arrangements which I have adopted in this apparatus have for effect to develop the sensitiveness to a very small expenditure of energy to permit of simple and rapid regulation.

The axis $a$ of the movable coil A of the electro-dynamometer makes, when in equilibrium, an acute angle (approximately of forty-five degrees) with the plane of the fixed coils B B', and this angle increases as the expenditure increases, so that the extent to which the needle is displaced for one certain accretion of current increases in proportion as the expenditure diminishes. It is in the neighborhood of zero three times what it is in the neighborhood of the maximum for which the counter is adapted. From this it results, first, that the apparatus is sensitive to small expenditures; second, that by varying the inclination of the needle with reference to the coil A the want of exactitude which experiment may reveal between the indications during slight and during large expenditures may be made to disappear. When these errors are suppressed and the clock-work is regulated nearly to seconds, it will be sufficient to make a trial during a determined time and to replace the wheel I of one hundred teeth by a wheel of a greater or less number of teeth, according as the counter records too fast or too slow. If the error is too great, the bevel-wheel N, which drives the clock-work, may be replaced by any suitable wheel without changing the pinion M, which may be raised or lowered on the tubular shaft L.

The apparatus is applicable to continuous or alternating currents. For the latter it will be sufficient to reduce the resistance of the branch which drives the clock-work.

I claim as my invention the following defined novel features and combinations, substantially as hereinbefore specified, namely:

1. In an electric meter, the combination of an electro-dynamometer, a counting or registering mechanism, and a clock-work for propelling the latter having a balance-wheel mounted on an arbor, an electro-magnet, the armature of which is formed on or carried by said arbor, and a circuit-breaker in electrical connection with the coil of said magnet and in mechanical connection with the arbor of the balance-wheel, and constructed to close the circuit through said magnet while the balance-wheel is turning in one direction only, whereby the balance-wheel receives an impulse from the magnet during each double oscillation while the current is passing through the meter and stops when the current is discontinued.

2. In an electric meter, the combination of a balance-wheel mounted on an arbor, an electro magnet or magnets, the armature of which is formed on or carried by said arbor, a circuit-breaker in electrical connection with the coils of said magnets, and a mechanical connection between said circuit-breaker and the balance-wheel arbor, consisting of a projecting tooth for imparting motion to the circuit-breaking spring, a fixed head on the arbor formed with a notch into which said tooth may enter, and a loose head on the arbor formed with a notch, which in one position coincides with the notch in the fixed head and connected to the fixed head through the medium of a lost-motion connection, whereby during the oscillation in one direction the notches are in coincidence and the tooth enters them, and during the oscillation in the opposite direction the movement of the fixed head in advance of the loose one carries the notches out of coincidence and the tooth is displaced.

3. In an electric meter, the combination, with a movable part or needle influenced by the condition of the circuit being measured, a counting or registering mechanism, and a clock-work or motor, of an intermediate mechanism for communicating motion from the motor to the register proportionally at each advance of the register to the condition of the circuit, consisting of a locking device for coupling the motor and register together, and a controlling device co-operating with the said needle to actuate the locking device at intervals whenever the needle is deflected, and to maintain it in action for a duration depending upon the extent of deflection of the needle.

4. In an electric meter, the combination, with a needle or other part in connection with the circuit to be measured and the movement or deflection of which depends upon the varying condition of said circuit, a clock-work or motor, and a register, of a toothed wheel for driving the register, a locking-tooth driven by the motor and adapted to drive said toothed wheel, but normally out of engagement therewith, and a revolving plate driven by the motor and traversing said needle, mounted to be displaced by the needle when it is deflected, and constructed to be displaced thereby for a duration proportional to the deflection of the needle, and connected to such locking tooth or pawl, whereby when so displaced it displaces said tooth or pawl into engagement with said toothed wheel, and thereby couples the motor to the register for a greater or less duration.

5. The combination, with a movable part or needle in connection with the circuit to be measured and the movement or deflection of which depends upon the varying condition of said circuit, a clock-work or motor, and a register, of a connecting mechanism intervening between the motor and register, consisting of an arbor driven by the motor, an inclined plane carried by said arbor and moving against the needle so as to lift the same at each revolution, a cam carried on said arbor and revolving with said inclined plane, whereby the needle, when lifted by the inclined plane, will drop onto said cam and depress the latter, and a coupling-connection between the motor and register operated by the displacement of said cam by the needle, whereby the motor is caused to drive the register at each revolution a distance proportional to the deflection of the needle and the conformation of the cam.

6. In an electric meter, the combination of a needle or moving part in connection with the circuit to be measured and adapted to be moved or deflected according to the varying condition of said circuit, a motor and a revolving cam driven by said motor and arranged to move under the point of the needle in a direction approximately perpendicular to the direction of the deflection of the needle, whereby when the needle is deflected it is encountered by said cam at each revolution and the said cam conformed relatively to the needle in such manner that the angle of the arc of the circle traversed at each revolution around the cam by the point of the needle is at each part proportional to the intensity or flow of the current deflecting the needle.

7. In an electric meter, the combination of an electro-dynamometer consisting of a fixed solenoid-coil and a pivoted solenoid-coil, the latter arranged when at rest at an acute angle with the fixed coil, whereby the displacement is proportionally greater with a feeble current than with a strong one, a spring tending to resist the deflection of the pivoted coil to a greater angle, a needle or moving part connected to and moved by the pivoted coil, a cam moving relatively to and co-operating with said needle at intervals and formed with a curve proportioned to the extent of initial deflection of the pivoted coil in such manner that the duration of co-operation between the needle and cam at each movement of the latter is proportional to the intensity or flow of the current acting on the electro-dynamometer.

In witness whereof I have hereunto signed my name in the presence of two subscribing witnesses.

ALPHONSE JEAN FRAGER.

Witnesses:
R. J. PRESTON,
AUGUSTE MATHIEU.